3,321,351
METHOD OF ADHESIVELY JOINING SURFACES
Erich Bäder, Hanau am Main, Germany, assignor to Deutsche Gold- und Silber-Scheideanstalt vormals Roessler, Frankfurt am Main, Germany
No Drawing. Filed Nov. 14, 1960, Ser. No. 68,586
Claims priority, application Germany, Dec. 31, 1955, D 22,026
5 Claims. (Cl. 156—332)

The present invention relates to improvements in a process for adhesively uniting surfaces, particularly metal surfaces, with adhesive compositions containing polymerizable substances, particularly liqiud monomers of compounds containing a terminal $>C=CH_2$ group.

Adhesive compositions are known which are prepared from polymerizable substances or mixtures of polymerizable substances which polymerize in the presence of catalysts and, if necessary, with heating and provide good cementing of various materials. Adhesive compositions of this type have proved particularly suited for cementing metals. When certain redox systems are used as catalysts, a satisfactory polymerization can even be effected at room temperature.

It is also known to add, to mixtures used as coating compositions containing polyester resins, small quantities of materials such as paraffin which form a non-sticky skin on the surface of such mixtures.

It is furthermore known that non-adherent surfaces can be produced in the polymerization of unsaturated compounds in the presence of air by adding waxy materials or paraffin to the product to be polymerized.

According to the invention it was unexpectedly discovered that compositions having good adhesive properties can be prepared from polymerizable vinyl compounds, that is, compounds containing a terminal $>C=CH_2$ group, by incorporating small quanities of paraffin, montan wax, beeswax, ceresine wax, spermaceti and the like in such compositions. It was rather to be expected from the above mentioned teaching of the prior art, namely, that the addition of waxy materials produced non-sticky surfaces, that the addition of wax would render the compositions unsuitable as adhesives. Nevertheless, it was found that the addition of such waxes does not reduce the cementing action of such compositions so that upon curing they are firmly bonded to materials, particularly metals, and are suitable for cementing materials together.

The preferred quantity of waxy substance employed according to the invention is between about 0.1% and 1.0% by weight of the adhesive composition.

In addition, it was unexpectedly found that the incorporation of small quantities of waxy materials in the adhesive compositions improves the "open time" of the adhesive compositions, that is, the length of time the adhesives can be applied to the surfaces to be joined before such surfaces are contacted and positioned so as to effect the adhesive union.

Preferably, redox systems are employed as curing catalysts for the compositions according to the invention. Redox systems which contain a peroxide, for example, an organic peroxide, as the oxidizing component, and organic sulfur compounds or tertiary amines as the reducing component, have been found particularly well suited. Such redox systems are abundantly described in the literature.

Polymerizable liquid monomeric compounds containing a terminal $>C=CH_2$ group which are excellently suited for the adhesives employed according to the invention, for example, are styrene, vinyl toluene, acrylic acid, methacrylic acid, lower alkyl esters of acrylic acid or methacrylic acid. Preferably, mixtures of such monomers with polymers of compounds containing a terminal $>C=CH_2$ group are employed, e.g. polystyrene, polymethylmethacrylate etc.

Unsaturated polyester resins have also proved to be excellently suited as components of the adhesive composition employed according to the invention. Preferably, the unsaturated polyester resin component is one containing a relatively large number of double bonds and essentially composed of short chained aliphatic polyhydric alcohols, such as glycol, 1,3-propyl glycol and the like, and short chained unsaturated polybasic acids, such as fumaric acid, maleic acid and the like. In addition, such resins may contain certain quantities of higher glycols, such as hexane diols and the like, as well as higher dicarboxylic acids, such as adipic acid, phthalic acid and the like.

The adhesive compositions employed according to the invention can be cured at room to moderately raised temperatures.

In addition to the monomeric substances, the polymerizates of such substances and the unsaturated polyesters, the adhesives according to the invention can also contain a polyvinyl ether, preferably polyvinyl methyl ether, although the presence of these substances is not critical within the scope of this invention.

Preferably the polymerizable liquid vinyl compounds containing terminal $>C=CH_2$ groups should be present in the adhesive mixtures in quantities from 10 to 85%, the polymerizates of such compounds from 0 to 50%, the unsaturated polyesters from 0 to 80% and the polyvinyl ethers from 0 to 40%, always relative to the weight of the whole adhesive mixture. Within these ranges the quantities of the components can be varied as one likes. The election of certain ratios depends only on the degree of toughness of the mixture which is wanted. Toughness is also influenced by the molecular weight of the polymers used.

The following examples will serve to illustrate several embodiments of the invention.

*Example 1*

A mixture of the following composition was prepared:

| | Percent |
|---|---|
| Vinyl toluene | 57.4 |
| Polystyrene | 29.8 |
| Divinyl benzene | 3.8 |
| Neoprene (polymerized 2-chloro-butadiene 1.3) | 2.7 |
| Fumaric acid dimethyl ester | 2.7 |
| Acrylic acid | 2.5 |
| Diethylol-p-toluidine | 0.7 |
| Hydroquinone | 0.015 |
| Paraffin | 0.4 |

Shortly before use, this mixture was mixed with 3% of a hardening paste composed of 50% benzoyl peroxide and 50% dibutylphthalate and employed to cement heat treated light metal strips (85 x 20 x 2 mm.) having a tensile strength of 30 kg./mm.$^2$ with a single 15 x 20 overlap. After 15 hours, a shear strength of 520 kg. was attained in the bond.

*Example 2*

A mixture of the following composition was prepared:

| | Percent |
|---|---|
| Unsaturated polyester resin with low acid number (prepared by the reaction of ethylene glycol with maleic acid anhydride) | 60.8 |
| Monostyrene | 33.5 |
| Cumarone resin | 5.0 |
| Diethylol-p-toluidine | 0.4 |
| Quinone | 0.1 |
| Paraffin | 0.2 |

Shortly before use, this mixture was mixed with 1% of benzoyl peroxide and employed to cement copper strips having a tensile strength of 20 kg./mm.$^2$ in the manner analogous to that described in Example 1. After standing over night, a shear strength of about 1.3 kg./mm.$^2$ was attained in the bond. This adhesive composition was especially adapted for bonding copper and copper alloys.

*Example 3*

A mixture of the following composition was prepared:

| | Percent |
|---|---|
| Unsaturated polyester resin (obtained by the reaction of glycerol with fumaric acid) | 22.8 |
| Monostyrene | 15.2 |
| Acrylic acid butyl ester | 3.2 |
| Powdered slate | 45.8 |
| Aerosil (silica aerogel produced by the vapor phase decomposition of silicon tetrachloride) | 0.53 |
| Cyclized rubber | 1.8 |
| Ketone aldehyde resin (obtained by condensation of acetophenone with formaldehyde) | 1.8 |
| Diethylol-p-toluidine | 0.4 |
| Quinone | 0.04 |
| Paraffin | 0.23 |

Shortly before use, this mixture was mixed with 1.5% of the hardening paste described in Example 1. Strips of automobile body sheet steel (100 x 20 x 0.8 mm.) having a tensile strength of 36 kg./mm.$^2$ were cemented with such composition with a single 15 x 20 mm. overlap. Shear strengths of 350–400 kg. were attained in the bond.

This composition is especially suited for cementing iron and steel and for filling larger depressions.

*Example 4*

A mixture of the following composition was prepared:

| | Percent |
|---|---|
| Glycol dimethacrylate | 6.67 |
| Methyl methacrylate | 51.0 |
| Butyl methacrylate | 10.0 |
| Neoprene | 2.95 |
| Unsaturated polyester resin as in Example 2 | 1.0 |
| Polystyrene | 33.0 |
| Aerosil | 0.67 |
| Paraffin | 0.201 |
| Di-i-propylol-p-toluidine | 0.536 |
| Hydroquinone | 0.0053 |

Shortly before use, the mixture was mixed with 3% of a hardening paste composed of 50% benzoyl peroxide and 50% dioctyl phthalate and employed to cement roughened Bondur (3.5–5.5% Cu, 0.3–0.5% Si, 0.3–1% Mn, 0.2–0.7% Mg and remainder Al) and steel strips. A shear strength of 3 kg./mm.$^2$ was obtained in the bond between the Bondur strips and about 3.2 kg./mm.$^2$ in the bond between the steel strips.

*Example 5*

A mixture of the following composition was prepared:

| | Percent |
|---|---|
| Allyl methacrylate | 1.008 |
| Methyl methacrylate | 50.6 |
| Butyl methacrylate | 10.0 |
| Neoprene | 2.95 |
| Unsaturated polyester as in Example 2 | 1.0 |
| Polystyrene | 33.0 |
| Aerosil | 0.67 |
| Paraffin | 0.201 |
| Di-i-propylol-p-toluidine | 0.536 |
| Hydroquinone | 0.0053 |

Shortly before use, this mixture was mixed with 3% of the same hardening paste as used in Example 4 and employed to cement roughened Bondur strips. A shear strength of 3.4 kg./mm.$^2$ was obtained in the bond.

*Example 6*

A mixture of the following composition was prepared:

| | Percent |
|---|---|
| Fumaric acid dimethyl ester | 1.54 |
| Divinyl benzene | 0.92 |
| Acrylic acid | 2.16 |
| Styrene | 54.12 |
| Neoprene | 2.08 |
| Aerosil | 0.66 |
| Di-i-propylol-p-toluidine | 0.66 |
| Paraffin | 0.14 |
| Hydroquinone | 0.015 |
| Polystyrene | 37.8 |

Shortly before use, this mixture was mixed with 3% of the hardening paste used in Example 4 and employed to cement roughened heat treated light metal strips having a tensile strength of 38 kg./mm.$^2$. A shear strength of 2.7 kg./mm.$^2$ was attained in the bond.

*Example 7*

A mixture of the following composition was prepared:

| | Percent |
|---|---|
| Paraffin | 0.3 |
| Di-i-propylol-p-toluidine | 1.0 |
| Paraplex P 444 [1] | 10.0 |
| Polyvinyl methyl ether | 25.0 |
| Methyl methacrylate | 63.7 |

[1] A polyester resin of Rohm and Haas Co., Philadelphia, acid No. 38, polyester concentration 75%, density 1.183, refractive index $n^{50}=1.4993$.

Shortly before use, this mixture was mixed with 3% of the same hardening paste as used in Example 4 and employed to cement roughened Bondur and steel strips. A shear strength of 2.2 kg./mm.$^2$ was obtained in the bonds between the Bondur strips and between the steel strips.

*Example 8*

The following different types of waxes were incorporated as the wax component in an adhesion composition: "Prima Stearin," "Extra Prima Stearin" and "Luxus Stearin" (all stearin products of Hammonia Stearin Fabrik, Germany), beeswax and ceresine wax.

The adhesive composition was of the following basic formula:

| | Percent |
|---|---|
| Di-i-propylol-p-toluidine | 1 |
| Wax | 0.3 |
| Hydroquinone | 0.003 |
| Methyl methacrylate | 66.12 |
| Polyvinyl methyl ether | 22.5 |
| Polyester resin as in Example 4 | 9.98 |
| Aerosil | 2 |

Shortly before use, 3% of the same hardening paste as used in Example 4 was incorporated in each of the compositions and such composition used to cement roughened Bondur strips.

The yield strengths in the bonds attained with the compositions were as follows:

| | Kg./mm.$^2$ |
|---|---|
| Adhesive containing "Prima Stearin" | 1.90 |
| Adhesive containing "Extra Prima Stearin" | 2.1 |
| Adhesive containing "Luxus Stearin" | 1.85 |
| Adhesive containing beeswax | 1.85 |
| Adhesive containing ceresine wax | 1.8 |

*Example 9*

Basic adhesion compositions of the following formulae were prepared:

(1)

| | Parts by weight |
|---|---|
| Methyl methacrylate | 64.7 |
| Unsaturated polyester resin as in Example 2 | 7.0 |
| Polyvinyl methyl ether | 27.0 |
| Diisopropylol-p-toluidine | 1.0 |
| Paraffin | 0.3 |
| Aerosil | 4.0 |
| Hardening paste (50% benzoyl peroxide in dioctyl phthalate) | 3.0 |

(2)

| | Parts by weight |
|---|---|
| Methyl methacrylate | 49.2 |
| Vinyltoluene | 10.0 |
| Unsaturated polyester resin as in Example 2 | 15.0 |
| Polyvinyl methyl ether | 25.0 |
| Diisopropylol-p-toluidine | 0.5 |
| Paraffin | 0.3 |
| Aerosil | 4.0 |
| Hardening paste (same as above) | 3.0 |

(3)

| | Parts by weight |
|---|---|
| Methyl methacrylate | 51.5 |
| Butyl methacrylate | 10.0 |
| Neoprene | 2.94 |
| Unsaturated polyester resin as in Example 2 | 1.0 |
| Diisopropylol-p-toluidine | 0.54 |
| Paraffin | 0.2 |
| Hydroquinone | 0.0054 |
| Aerosil | 0.67 |
| Polystyrene | 33.0 |
| Hardening paste (same as above) | 3.0 |

These adhesives were then used to cement various metal strips with and without additions of paraffin wax. The metal strips were roughened with emery paper. The hardening temperature was 20–22° C. and the hardening time 1 day. The metal strips were all 20 mm. wide.

The following table gives the results obtained:

Example 10

The same basic adhesives were employed as in Example 9, except that in this instance one of the surfaces of the metal strips to be joined was coated with an adhesive composition containing only the peroxidic component of the catalyst system and the other with the amine component. Each of the respective coatings contained double the quantity of component in question indicated in the formulae so that the quantity of such component in the total adhesive in the bond formed by the superposed two coatings is equal to that given in the formulae. The metal strips joined were heat treated light metal (AlMgSi alloy) strips 20 mm. wide which had been roughened with emery paper. The length of the overlap was 10 mm. The hardening temperature was 20–22° C. and the hardening time 1 day.

The results attained are given in the following table:

TABLE 2

| Adhesive | Paraffin, part by weight | Open time, hrs. | Shear strength in kg. |
|---|---|---|---|
| 1 | 0.3 | 0 | 380 |
|   | 0   | 0 | 400 |
|   | 0.3 | 4 | 325 |
|   | 0   | 4 | 0–5 |
|   | 0.3 | 18 | 250 |
|   | 0   | 18 | 0–5 |
| 2 | 0.3 | 0 | 500 |
|   | 0   | 0 | 530 |
|   | 0.3 | 4 | 525 |
|   | 0   | 4 | 5 |
|   | 0.3 | 18 | 475 |
|   | 0   | 18 | 0–5 |
| 3 | 0.2 | 0 | 615 |
|   | 0   | 0 | 510 |
|   | 0.2 | 4 | 570 |
|   | 0   | 4 | 10 |
|   | 0.2 | 18 | 460 |
|   | 0   | 18 | 0 |

This application is a continuation-in-part of my prior application S.N. 630,736, filed Dec. 27, 1956, now abandoned.

TABLE 1

| Adhesive | Paraffin, part by weight | Material bonded | Length of overlap, mm. | Open time in min. | Shear strength in kg. |
|---|---|---|---|---|---|
| 1 | 0.3 | Heated treated light metal (AlMgSi alloy). | 5 | Bonded immediately | 260 |
|   | 0   | do | 5 | do | 185 |
|   | 0.3 | do | 10 | do | 425 |
|   | 0   | do | 10 | do | 325 |
|   | 0.3 | do | 5 | 15 | 210 |
|   | 0   | do | 5 | 15 | 50 |
|   | 0.3 | do | 10 | 15 | 330 |
|   | 0   | do | 10 | 15 | 150 |
|   | 0.3 | Zinc | 5 | Bonded immediately. | 200 |
|   | 0.3 | Steel | 5 | do | 300 |
|   | 0.3 | Copper | 5 | do | 320 |
| 2 | 0.3 |  | 10 | 15 | 435 |
|   | 0   |  | 10 | 15 | 290 |
| 3 | 0.2 | AlMgSi alloy | 5 | Bonded immediately. | 400 |
|   | 0   | do | 5 | do | 75 |
|   | 0.2 | do | 10 | do | 615 |
|   | 0   | do | 10 | do | 375 |
|   | 0.2 | do | 5 | 15 | 380 |
|   | 0   | do | 5 | 15 | 265 |
|   | 0.2 | AlCuMg alloy | 10 | Bonded immediately. | 620 |
|   | 0.2 | Steel | 10 | do | 610 |
|   | 0.2 | Spring steel | 10 | do | 680 |

It will be seen from the above table that in each instance the presence of paraffin in the adhesive composition materially increased the bond strength attained after an open time of only 15 minutes.

I claim:

1. A method of adhesively joining surfaces of metals which comprises applying an adhesive composition formed of at least one polymerizable liquid ethylenically unsaturated compound containing a single terminal $>C=CH_2$ group and a catalytic amount of a redox system as a curing catalyst and containing 0.1 to 1% by weight of a waxy material selected from the group consisting of paraffin, ceresine, animal waxes and vegetable waxes between the surfaces to be joined and curing such adhesive composition in contact with and between such surfaces to be joined.

2. The method of claim 1 in which said adhesive composition also contains an unsaturated polyester resin produced from at least one short chained aliphatic polyhydric alcohol and at least one polycarboxylic acid, at least one short chained aliphatic of the alcohol and acid components of such polyester resin containing at least one aliphatic $>C=C<$ bond.

3. The process of claim 1 in which said polymerizable compound is styrene.

4. The process of claim 1 in which said adhesive composition also contains a polymer of said compounds containing a terminal $>C=CH_2$ group.

5. The process of claim 1 in which said polymerizable compound is styrene and said waxy material is paraffin.

References Cited by the Examiner

UNITED STATES PATENTS

| | | | |
|---|---|---|---|
| 2,480,928 | 9/1949 | Hurdis | 260—866 |
| 2,551,952 | 5/1951 | Kunkle | 260—28.5 |
| 2,808,386 | 10/1957 | D'Alelio | 260—28.5 X |
| 2,843,556 | 7/1958 | Moorman | 260—28.5 |
| 2,894,932 | 7/1959 | Bader et al. | 154—140 X |
| 2,917,485 | 12/1959 | Newberg | 260—28.5 X |
| 2,921,867 | 1/1960 | Shaw | 260—28.5 |

FOREIGN PATENTS 713,332   8/1954   Great Britain.

ALEXANDER WYMAN, *Primary Examiner.*

CARL F. KRAFFT, *Examiner.*

R. J. ROCHE, *Assistant Examiner.*